(12) United States Patent
Wastiaux et al.

(10) Patent No.: US 7,543,733 B2
(45) Date of Patent: Jun. 9, 2009

(54) METHOD OF PROTECTING AGAINST CORROSION AT HIGH TEMPERATURE

(75) Inventors: Sophie Wastiaux, Aulnay Sous Bois (FR); Michel Poteau, Dammartin En Goele (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 185 days.

(21) Appl. No.: 10/603,530

(22) Filed: Jun. 25, 2003

(65) Prior Publication Data

US 2005/0173495 A1 Aug. 11, 2005

(30) Foreign Application Priority Data

Mar. 17, 2003 (FR) ................................. 03 03238

(51) Int. Cl.
*B21D 39/04* (2006.01)
*B23K 1/00* (2006.01)
(52) U.S. Cl. ...................... 228/128; 228/126; 228/127; 228/131; 228/182; 228/183; 228/184; 228/189; 285/55; 285/288.1; 285/288.6
(58) Field of Classification Search ......... 228/126–134, 228/182–184, 189, 208, 214; 285/44, 55, 285/288.1–289.5, 328–334.5
See application file for complete search history.

(56) References Cited

U.S. PATENT DOCUMENTS 2,312,579 A * 3/1943 O'Brien ...................... 228/132
2,367,206 A * 1/1945 Davis ......................... 29/421.2
2,382,098 A * 8/1945 Robie ......................... 285/397
2,895,747 A * 7/1959 Bland et al. ................. 285/21.1

(Continued)

FOREIGN PATENT DOCUMENTS

EP          0 903 424          3/1999

(Continued)

OTHER PUBLICATIONS

International Search Report for PCT/IB2004/000690.

(Continued)

*Primary Examiner*—Steven Bos
*Assistant Examiner*—Paul Wartalowicz
(74) *Attorney, Agent, or Firm*—Elwood Haynes

(57) ABSTRACT

The invention relates to a method of protecting equipment intended to operate at high temperature in the presence of a fluid containing at least one hydrocarbon and/or carbon monoxide against corrosion by metal dusting, method in which pieces of the equipment are made from an alloy containing nickel, iron, chromium and/or aluminum, and in which said pieces of the equipment are protected from said corrosion by a protective coating. This method is characterized in that said equipment pieces protected in this way are connected to each other by means of joining pieces, said joining pieces being protected beforehand by a protective coating over at least part of their surface intended to be brought into contact with said fluid at high temperature, and in that each of the connections intended to be subjected to said corrosion is produced by external welding of the ends of the joining piece with said pieces of equipment.

7 Claims, 6 Drawing Sheets

U.S. PATENT DOCUMENTS

| | | | |
|---|---|---|---|
| 3,266,820 A | * | 8/1966 | Leborgne et al. ............ 285/21.1 |
| 3,359,626 A | | 12/1967 | Gniewek et al. |
| 3,534,986 A | * | 10/1970 | Heinz et al. .................... 285/55 |
| 3,708,864 A | * | 1/1973 | Patel ........................... 228/154 |
| 3,948,434 A | * | 4/1976 | Rothchild ................. 228/234.3 |
| 3,965,555 A | * | 6/1976 | Webster et al. ........... 29/890.14 |
| 3,979,273 A | | 9/1976 | Panzera et al. |
| 4,357,745 A | * | 11/1982 | Chlebowski ................. 29/460 |
| 5,001,320 A | * | 3/1991 | Conley et al. ................. 219/61 |
| 5,224,738 A | | 7/1993 | Taga |
| 5,265,790 A | * | 11/1993 | Mumford et al. ............ 228/189 |
| 5,477,014 A | * | 12/1995 | Dunne et al. ................. 181/244 |

FOREIGN PATENT DOCUMENTS

GB          824 717          12/1959

OTHER PUBLICATIONS

Patent Abstract for JP 63 221838, Sep. 14, 1988.

* cited by examiner

METHOD OF PROTECTING AGAINST CORROSION AT HIGH TEMPERATURE

This application claims the benefit of priority under 35 U.S.C. § 119(a) and (b) 1 to French Application No. 03 03238, filed Mar. 17, 2003, the entire contents of which are incorporated herein by reference.

BACKGROUND

The present invention relates to a method of protecting equipment intended to operate at high temperature in the presence of a fluid containing at least one hydrocarbon and/or carbon monoxide against corrosion by metal dusting, in which pieces of the equipment are made from alloys containing nickel, iron, chromium and/or aluminum, and in which said pieces of the equipment are protected from said corrosion by a protective coating.

In the rest of the description, the term "high temperature" means a temperature at least equal to the temperature at which the metal dusting phenomenon appears. It is commonly understood that this phenomenon appears at temperatures of about 450° C. or more.

Corrosion of the metal dusting type is a major problem in industrial processes for which the alloys used for the production of equipment items and of pipework operate at high temperature in the presence of hydrocarbons and/or carbon monoxide. It has been found that, after a relatively long period of operation, a corrosive attack is manifested by the gradual dusting of the alloy.

In particular, in the case of steam reforming, natural gas or other hydrocarbons are transformed into carbon monoxide, hydrogen and carbon dioxide by catalytic reaction over nickel catalysts. Downstream of the steam reforming furnace, the equipment is subjected to corrosion by metal dusting, which damages the alloys from which it is constructed.

Various solutions have been proposed in order to reduce this phenomenon, including the use of surface coatings which make it possible to strengthen the corrosion resistance of the alloys. The aluminization of the surfaces intended to be subject to this corrosion is in particular used in order to limit this phenomenon.

To optimize this protection, EP 0 903 424 describes a method intended to improve the protection of a so-called high-temperature alloy containing iron, nickel or chromium from metal dusting, a method consisting in depositing a thin layer of metal from group IV or V of the periodic table with a thickness of between 0.01 and 10 μm on the surface to be protected, and to rebake the treated surface in an inert atmosphere.

However, although the alloy coatings provide satisfactory protection, there is still the problem of connections between protected pieces. Bonding by welding between protected pieces requires using particular connections in order to provide continuity of protection.

At present, no satisfactory solution for this problem of joining protected pieces is known.

This is because, when the pieces to be connected are protected before welding, the welding destroys the protection of the welded region and adversely affects the protection of the adjacent region. When this protection is applied after welding, the protection is then produced over a filler material with a different composition and/or structure; in this case, the diffusion speeds of the various chemical elements are affected leading to different and often reduced quality and thickness in the welded region with respect to the base material unaffected by the welding. Furthermore, given the available welding material, the piece to be welded to the support cannot be fastened for small-diameter pipework. It is therefore not possible to protect junctions directly on site.

Thus, whatever the improvements in protection provided on the type of alloy used for producing the equipment, on the type of surface coating used for protecting the alloy and on the operating conditions of the industrial process for which the equipment is intended, it is still the case that the particular problem of corrosion at the connections between protected pieces remains. Now this corrosion, even when localized, may lead to the failure of equipment items which operate under pressure conditions which may reach 50 bar.

SUMMARY

The aim of the invention is to solve this problem of localized corrosion at the connections between protected pieces.

To do this, according to one characteristic of the invention, the latter relates to a method of protecting equipment intended to operate at high temperature in the presence of a fluid containing at least one hydrocarbon and/or carbon monoxide against corrosion by metal dusting in which pieces of the equipment are made from an alloy containing nickel, iron, chromium and/or aluminum, and in which said pieces of the equipment are protected from said corrosion by a protective coating, characterized in that:

said equipment pieces protected in this way are connected to each other by means of joining pieces, said joining pieces being protected beforehand by a protective coating over at least part of their surface intended to be brought into contact with said fluid at high temperature, each of the connections intended to be subjected to said corrosion is produced by external welding of the ends of the joining piece with said pieces of equipment.

According to one particular embodiment of the invention, the joining pieces have been protected beforehand by aluminization.

According to another aspect of the invention, the latter relates to a plant for generating synthesis gas from a hydrocarbon mixture, characterized in that it comprises equipment protected by implementing the method as defined above.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
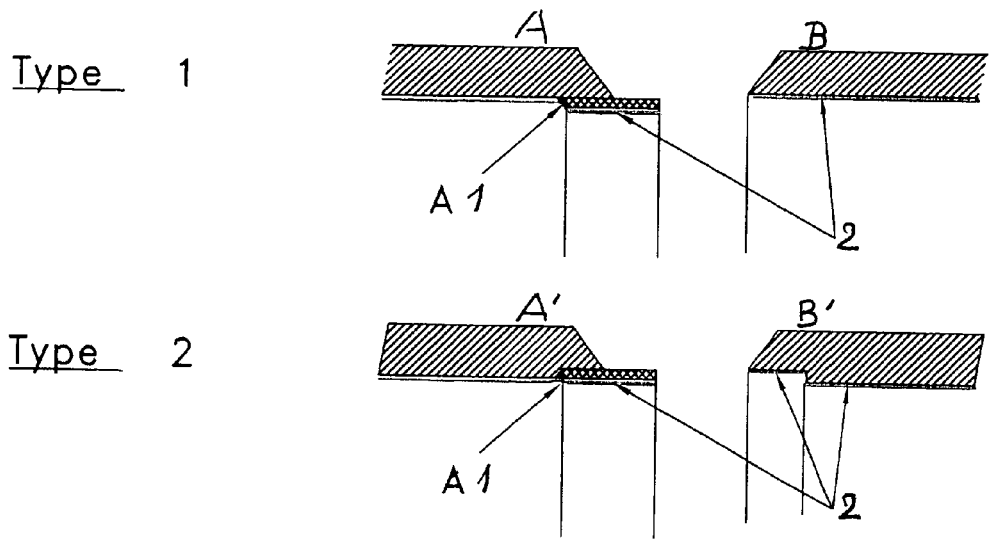
FIG. 1 illustrates two common connections employing a support strip.

FIG. 1 shows two types of conventional connection with a support strip. In both cases, both the equipment pieces having to be connected and the support strip have been protected by aluminization at least in the regions which will be subjected to corrosion.

According to connection type 1, the support strip is placed on the inner face of the equipment and projecting from the surface, it is welded to the end A of the equipment at point A1, the chamfered end B of the equipment is designed to be brought in contact with the end A of the equipment, itself chamfered; these two ends are then welded on their outer face. This conventional solution in particular has two drawbacks:
- production of the weld A1 is difficult, or even impossible, using current means in pipework with a diameter less than 100 mm,
- the protective layer has defects in the welded region A1, in particular associated with the differences in material and structure which risk initiating the metal dusting phenomenon.

According to connection type 2, the support strip is placed on the inner face of the equipment, but in spaces made at the ends A' and B' thereof, such that this strip does not project from the surface, it is welded to the end A of the equipment at the point A'1, the chamfered end B' of the equipment is designed to be brought in contact with the end A' of the equipment, itself chamfered, while the second end of the slot slides in the space made for this purpose on the inner face of B'; in this case, the two ends A' and B' may also be welded on their outer face. This solution in particular has three drawbacks:
- producing the weld A'1 is difficult, or even impossible, using current means in pipework with a diameter less than 100 mm,
- the protective layer has defects in the welded region A'1, this defect in protection which risks initiating the metal dusting phenomenon,
- because of the recesses made on the equipment, it is not possible to adjust the length of the pieces.

Figure 2:
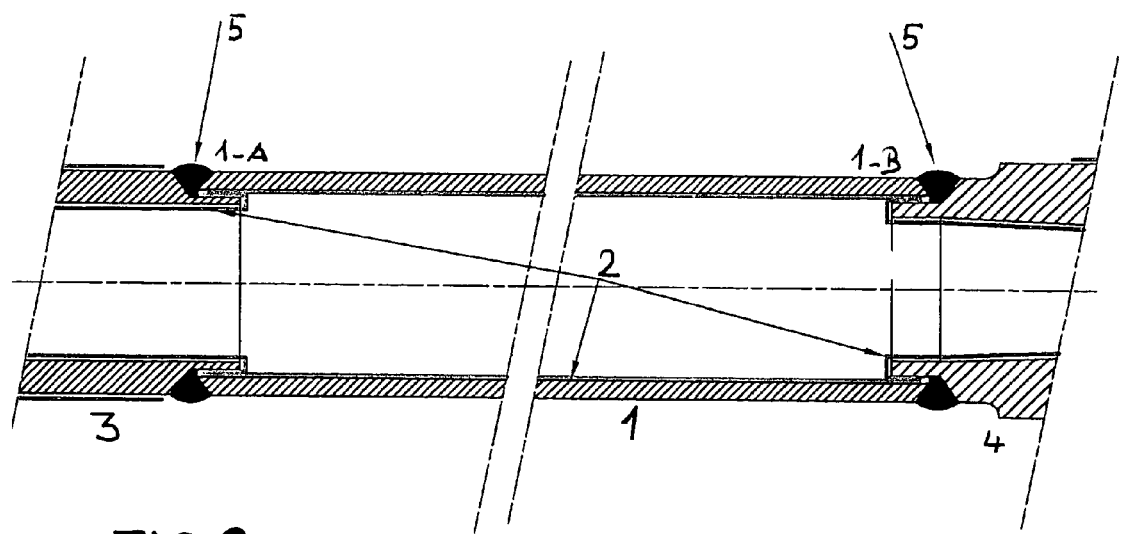
FIG. 2 illustrates a schematic view of a connection at the ends of a pipe, as according to one embodiment of the current invention.

In FIG. 2, the two ends 1-A and 1-B of a pipe 1 are shown, a piece constituting the equipment whose inner surface has been treated by aluminization. The aluminization coating 2 is shown in all of FIGS. 1 to 7 by a thick line adjacent to the thin hatched lines showing the surface of the piece.

Two different junction pieces 3 and 4 are connected to the ends of the pipe 1; their geometries are associated with the functions which are allocated thereto.

The junction piece 3 is bonded to the end 1-A of the pipe 1. The connection is made by fitting the end of the junction piece inside the pipe 1. The two pieces are then welded on the outside of the assembly formed in this way, in the space made for this purpose. The inner surface of the junction piece 3 and the part of this same piece 3 designed to be fitted inside the pipe 1 are covered by aluminization. Thus there is continuity of the quality of the surface finish. The weld joint 5 is made on the outer surface of the pieces. Thus this weld in no way affects the surface finish of the inner surfaces of the pieces which will be subject to corrosion.

Similarly, the junction piece 4 is bonded to the end 1-B of the pipe 1. Whatever the slightly different shapes on their outer surfaces, the ends of the pieces 3 and 4 both reproduce the main characteristics of the invention. Thus the piece 4 is protected by a surface treatment over at least the part of its surface which will be subjected to corrosion and the weld forming the junction between the pieces 1, at 1-B and 4, are located on the outer surface of the pieces.

Figure 3:
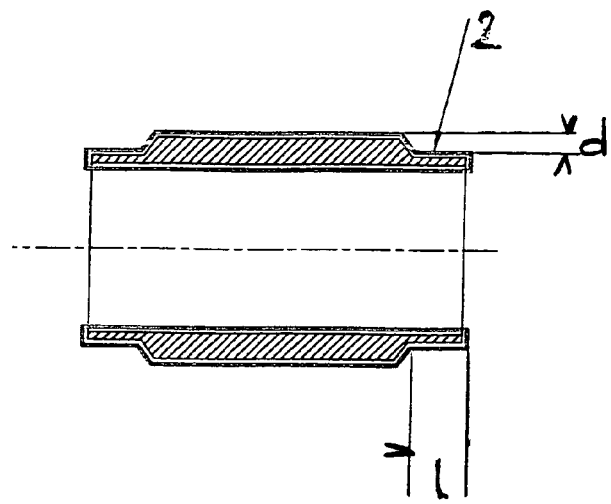
FIG. 3 illustrates a schematic view of one embodiment of a junction piece, according to one embodiment of the current invention.

FIG. 3 shows a junction piece according to the invention having at least one end identical to that of the junction piece 3 of FIG. 2. Thus, said piece is of the type with a constant inner diameter, while its outer diameter has a given restriction d at its ends, over a length l such that it can be matched to the end of the piece which must be connected thereto. Furthermore, a chamfer is made at the outer diameter restriction, which chamfer will then be positioned facing the chamfer compatible with the other piece to be bonded, during connection, such that these two chamfers denoting a V-shaped groove on the periphery of the bonded assembly are capable of receiving added material intended to form the weld joint. When the piece is small, it is easy to completely aluminize it, as shown in FIG. 3.

Figure 4:
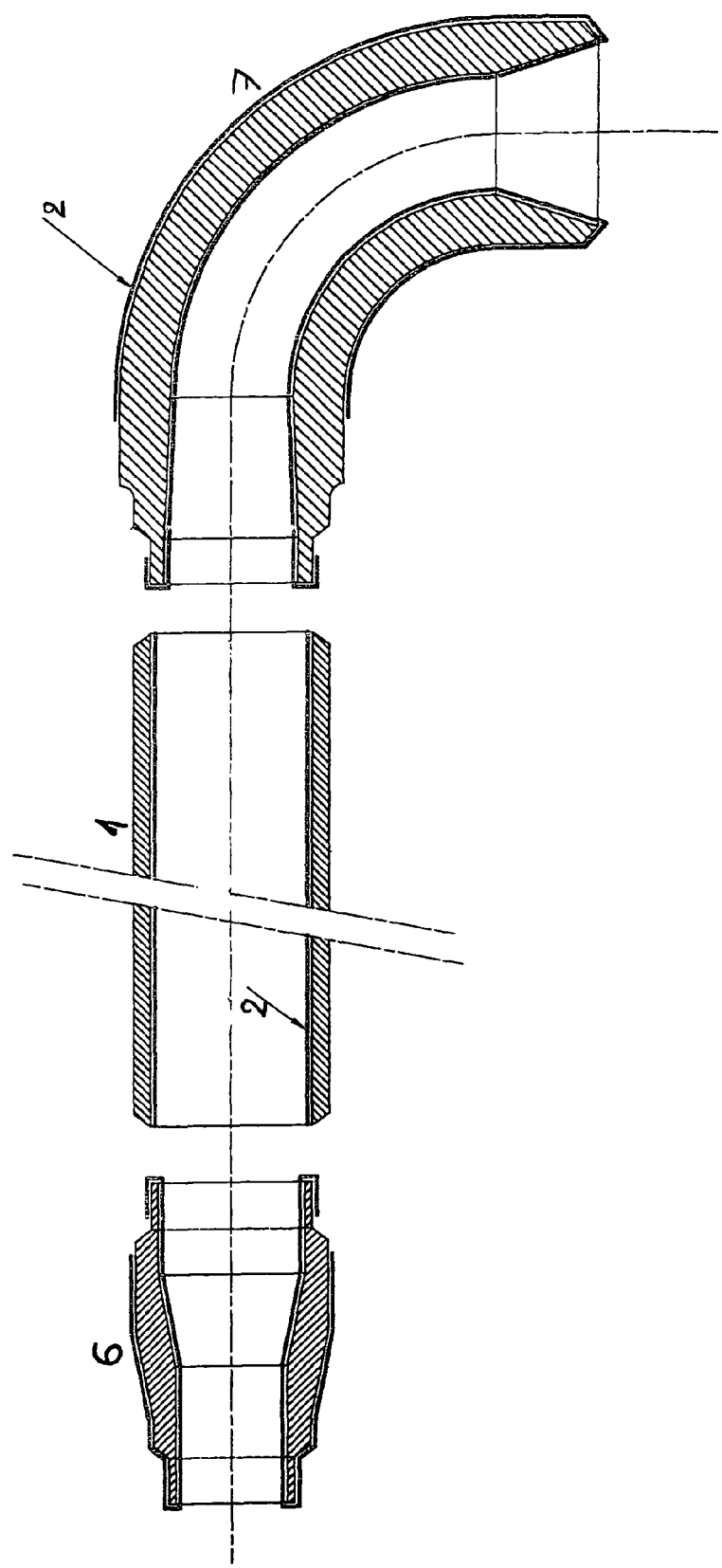
FIG. 4 illustrates another view of the embodiment shown in FIG. 2.

FIG. 4 shows the pipe 1 and two junction pieces referenced 6 and 7. In this case, the piece 6 is a straight junction piece, providing a function of restricting passage of fluid, whose two ends are protected according to the invention, and having an external geometry which is compatible with the requirements of the plant (not described here). The piece 7 is a bent junction piece, having modifications of internal diameters, the end located opposite the pipe 1 of which is protected according to the invention. The other end of this piece 7, not having to be in an exposed region, is not required to be resistant to said high-temperature corrosion. Moreover, it will be noted that the pieces 6 and 7, which are small, have been aluminized beforehand over their entire surface. So as to be able to produce subsequent welds, the coating is removed at the chamfers and in their immediate vicinity.

Figure 5:
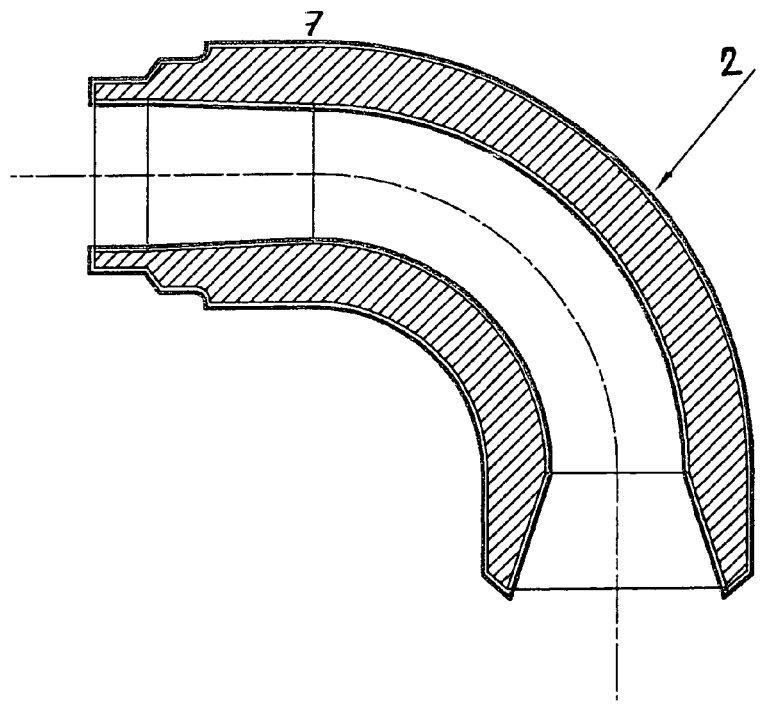
FIG. 5 illustrates a schematic view of a junction piece, according to one embodiment of the current invention.
Figure 6:
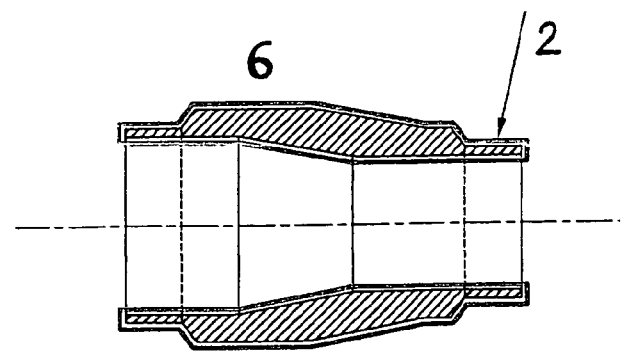
FIG. 6 illustrates another schematic view of a junction piece, according to one embodiment of the current invention.
Figure 7:
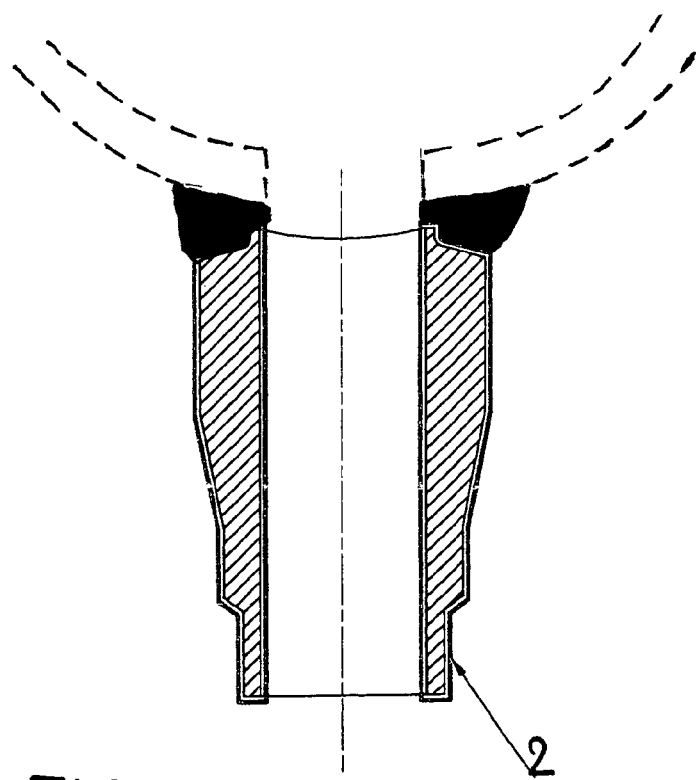
FIG. 7 illustrates another schematic view of a junction piece, according to another embodiment of the current invention.

FIGS. 5 to 7 show examples of junction pieces according to the invention having variable geometries, according to the requirements of the plant.

FIG. 5 reproduces the piece 7 of FIG. 4, which is completely aluminized, and one of the ends of which will operate in a region of the plant where the temperature is less than the temperature at which the metal dusting phenomenon appears; since it is not subjected to the risk of corrosion, it is not required to comply with the characteristics of the invention at this end.

FIG. 6 reproduces the completely aluminized piece 6 of FIG. 4, with a restriction in inner diameter. It is capable of operating under metal dusting corrosion conditions over its entire length.

FIG. 7 reproduces a junction piece intended to be adapted to the input of a reactor.

Figure 8:
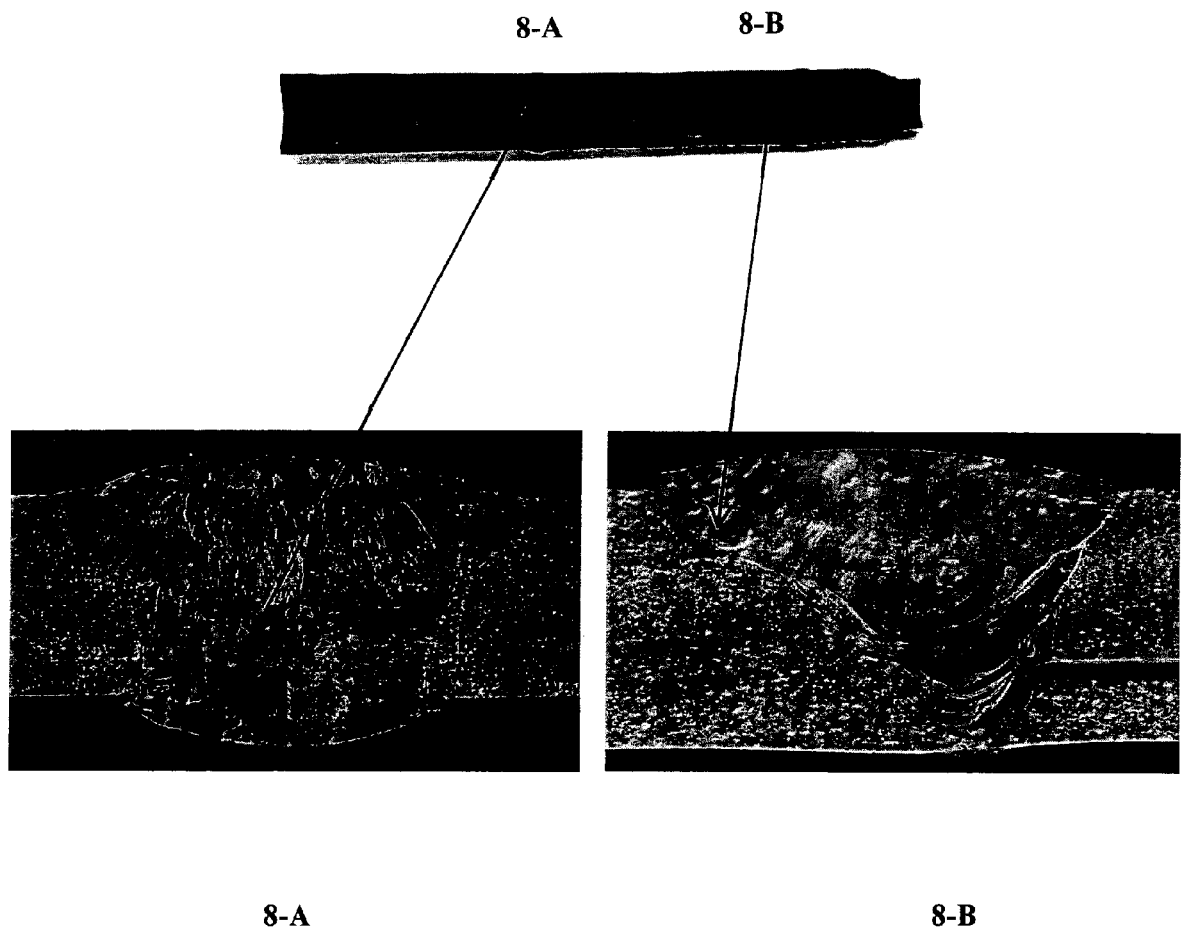
FIG. 8 illustrates a view of a common weld.

FIG. 8 shows a tube, aluminized, connected at its two ends to:
- at end 8-A, a tube of same diameter using conventional weld; it illustrates the non-continuity of the protection,
- at end 8-B, a junction piece is connected to the tube; the weld does not reach the inner face of the tube.

Figure 9:
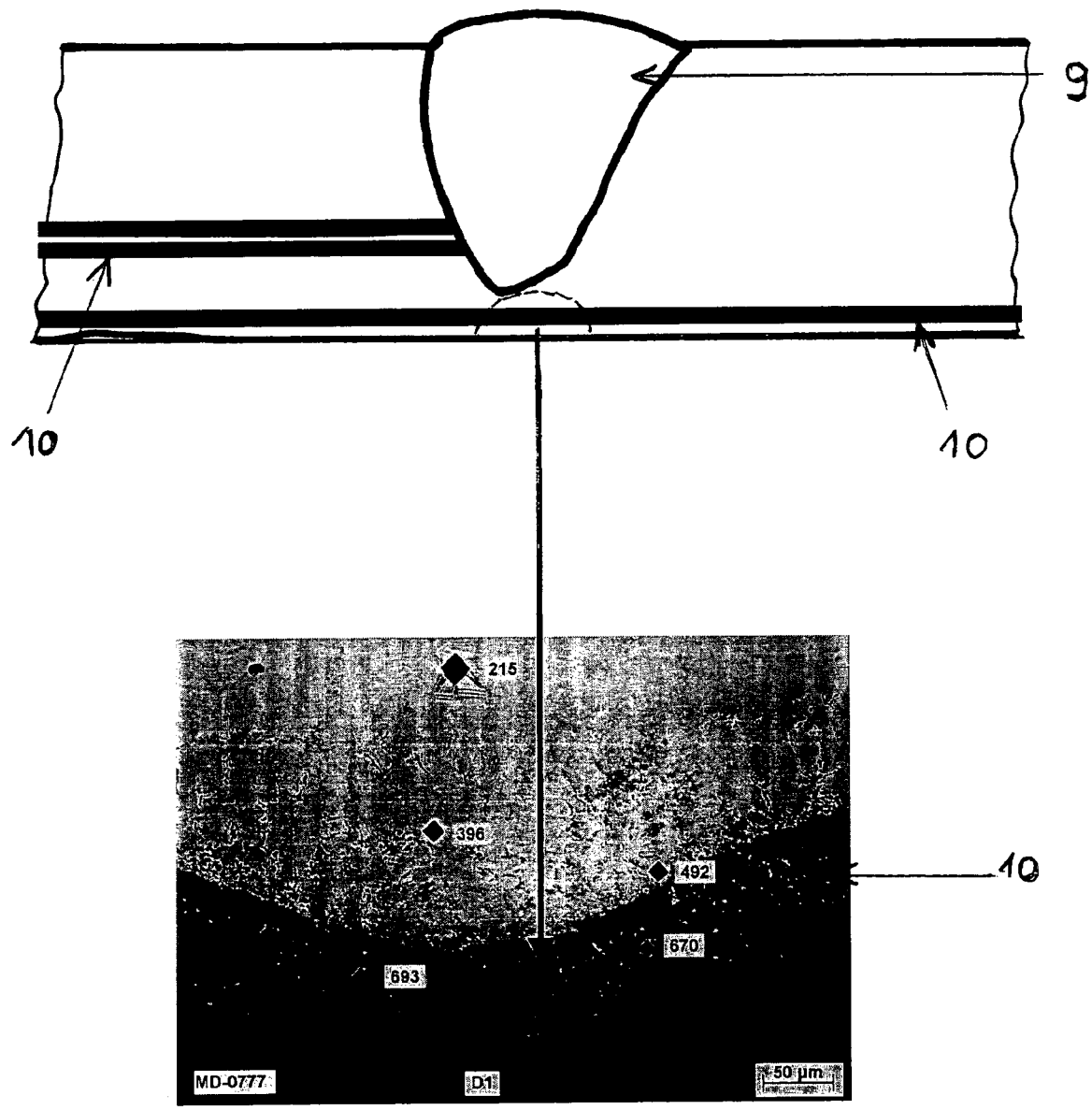
FIG. 9 illustrates a view of a weld incorporating an aluminized layer produced according to one embodiment of the current invention.

FIG. 9 illustrates the connection at end 8-B. The weld metal does not reach the inner face. The aluminization coating 10 is shown by the thick line on the schematic view, and by the grey zone along the inner surface of the tube on the photography; this shows that the aluminized layer at the inner surface is still present, after the welding.

As will have been understood from the above, using the pieces according to the invention has the following advantages:
- the absence of intervention on the protective regions of the junction pieces and on the equipment when producing connections strongly contribute to improving the inhibition of metal dusting corrosion over all the equipment during its operation;

thanks to the geometry of the junction pieces, the welds are made outside the pieces to be connected, they may therefore be used for small diameters;

the welds and the regions affected by the welding are not directly exposed to the corrosive atmosphere and do not have to be protected by the surface treatment;

the small junction pieces can easily be completely protected (inner and outer surface) with better thickness control at every point;

all the welds may be made on site;

the length of the pipes forming the equipment may be adjusted since their ends do not have any particular geometry.

Whatever the invention has been described in relation to models of particular junction pieces, it is not limited thereby but is susceptible to modifications and to variants without departing from the scope of the invention.

The method of improving the protection of equipment according to the invention is particularly suited to protection of equipment items used during the generation of synthesis gas.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for protecting a tubular junction, comprising:
    providing a first tubular and a second tubular, each tubular having an outer surface and an interior surface for the passage of fluid;
    placing a protective surface finish on an interior of the tubulars;
    providing a joining tubular having a surface finish on an interior thereof;
    connecting the joining tubular between the first and second tubulars to create a junction, the junction only including the joining tubular and an end of each of the first and second tubulars and having a continuous surface finish on an interior surface thereof; and
    welding the joining tubular to the first and second tubulars in a manner whereby the continuous surface finish remains on the interior surface of the junction along a non-welded portion between the joining tubular and the end of each of the first and second tubulars.

2. The method of claim 1, wherein the first and second tubulars are made of an alloy, the alloy comprising at least one member selected from the group consisting of:
    1) nickel;
    2) iron;
    3) chromium; and
    4) aluminum.

3. The method of claim 1, wherein the welding takes place on an exterior of the junction.

4. The method of claim 1, wherein the protective coating on the first and second tubulars is a made by aluminization.

5. The method of claim 4, wherein the protective coating on the junction tubular is made by aluminization.

6. A method of joining tubulars, comprising:
    providing at least two tubulars and at least one joining tubular, each tubular having an outer surface and an inner surface defining a fluid path;
    treating the at least two tubulars with a first protective coating, wherein:
    a) the first protective coating is selected to protect the pieces of equipment from exposure to temperatures at least equal to the temperature at which metal dusting occurs and to at least one fluid, wherein the fluid comprises at least one member selected from:
        1) a hydrocarbon; and
        2) carbon monoxide; and
    b) the pieces of equipment are made from an alloy, wherein the alloy comprises at least one member selected from:
        1) nickel;
        2) iron;
        3) chromium; and
        4) aluminum;
    treating the at least part of an interior surface of the joining tubular with a second protective coating selected to protect the coated joining tubular from corrosion over at least part of the interior surface of the joining tubular; and
    welding the treated joining tubular to each of the respective tubulars in a manner whereby a continuous protective coating remains along a non-welded portion between the two tubulars and the joining tubular.

7. The method of claim 6, wherein the second protective coating is produced by aluminization.

* * * * *